June 13, 1933.  C. V. FOULDS  1,913,589
SHAFT COUPLING
Filed July 24, 1931

INVENTOR,
Charles V. Foulds
BY Booth & Booth.
ATTORNEYS.

Patented June 13, 1933

1,913,589

UNITED STATES PATENT OFFICE

CHARLES V. FOULDS, OF BERKELEY, CALIFORNIA, ASSIGNOR TO THE PELTON WATER WHEEL COMPANY, OF SAN FRANCISCO, CALIFORNIA, A CORPORATION OF CALIFORNIA

SHAFT COUPLING

Application filed July 24, 1931. Serial No. 552,939.

The present invention relates to couplings for rotating shafts, and is especially adapted for shafts which are under continuous tension, such as those of rotary well pumps.

The objects of the invention are to provide a coupling of requisite strength which will not be affected by reversal of the direction of rotation of the shaft, which provides accurate alignment of the coupled shaft sections, and which is cheap to manufacture and simple and easy to install.

Although primarily intended for use in shafts which are under continuous tension, the invention may, by a very slight modification, be adapted for use in any other rotating shafts, whether vertical or horizontal, with the same objects and advantages as in the case of tension shafts. It is to be understood, moreover, that changes may be made in the form, construction, and arrangement of the several parts, within the limits of the appended claims, without departing from the spirit of the invention as set forth therein.

Reference should be had to the accompanying drawing, in which

Figure 1:
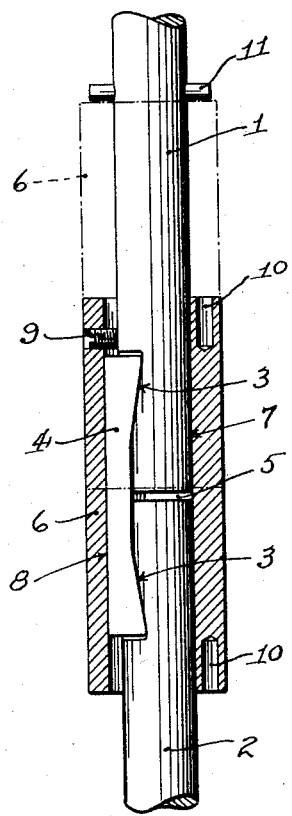
Fig. 1 is a longitudinal section of a simple form of coupling adapted for shafts under continuous tension.

In the drawing, the reference numerals 1 and 2 designate adjacent shaft sections to be coupled together. Each is provided with a notch 3 in one side near its end, said notches having transversely flat bottoms inclined inwardly from the shaft ends, as shown. A key 4, of substantially rectangular cross section, lies within said notches, bridging the joint 5 between the shaft sections. The key 4 is formed with oppositely inclined inner faces adapted to fit closely against the bottoms of the notches 3. A sleeve 6 fits over the shaft sections and the key 4.

The interior of the sleeve 6 is provided with a cylindrical bore 7, in one side of which is milled a substantially rectangular channel 8 within which the key 4 is a free sliding fit. The cylindrical bore 7 is a free sliding fit upon the shaft sections. A dowel or screw 9 is provided near one end of the sleeve 6 for contact with the end of the key 4 to prevent said sleeve from dropping down below the position shown. If desired, holes 10 may be drilled in the ends of the sleeve, on the side opposite the channel 8, to balance its weight in order to minimize vibration in high speed shafts.

In assembling the coupling in a vertical shaft such as that employed in a well, the sleeve 6 is first slipped over the end portion of the upper shaft section 1 until the notch 3 therein is exposed below said sleeve. The upper end of the key 4 is then fitted into said notch, and the sleeve 6 lowered until its lower end covers the upper half of said key and is about level with the lower end of said shaft section, as indicated by broken lines in Fig. 1. By pulling down on the key, the sleeve will be wedged and thereby held in this position. If desired, a pin 11 may be placed through the shaft 1 above the sleeve, to keep it from being again lifted sufficiently to allow the key to drop out. The shaft 1, the sleeve, and the key are thereby permanently assembled, and cannot be separated without removing the pin 11 and raising the sleeve. The pin 11, although not essential to the successful assembling or functioning of the coupling, is useful in the case of well pump shafts, because it prevents the key from accidentally dropping out and falling down into the pump or well.

The upper shaft 1, with the sleeve and key secured thereupon as described above, is then lowered upon the lower shaft 2, the lower end portion of the key being fitted into the notch 3 in said lower shaft. As soon as the lower end of the key abuts against the end of said notch, said key is thereby raised slightly, thus releasing the sleeve which immediately drops to its final position over the upper end of the lower shaft 2, as shown in full lines. The dowel 9 prevents said sleeve from dropping too far.

The coupling is now completely assembled, and upon placing the shafts under tension, they are wedged tightly within the sleeve by the key, thus locking the entire device against lateral or angular play.

In order to take the coupling apart, it is only necessary to force the shaft sections together to release the wedging effect of the key, and lift the sleeve until its lower end clears the upper end of the lower shaft 2, whereupon said lower shaft can be removed.

From the foregoing description of the structure, and the procedure necessary to effect its purpose, it will be seen that the relative endwise movement of the shaft sections 1 and 2, and the end play of the key 4 between the ends of the notches 3 must bear a given relation, namely, the play at each end of the key must be less than the movement of the shaft sections. If it were not, the ends of the shaft sections would come together in the assembling process too soon, that is, before the key, temporarily wedged to the sleeve and upper shaft, had reached its abutment against the end of the notch of the lower shaft. The key would not, therefore, be moved upwardly to free the sleeve to permit it to drop to its final locking position as shown in Fig. 1. So too, in taking the coupling apart, if the end play of the key were greater than that between the shaft sections, the single act of moving said sections together would not necessarily release the key from both sections, and would not free the sleeve to allow it to be slid upwardly. The possible endwise movement between the shaft sections, as measured by the space between their ends when the coupling is assembled, therefore must be greater than the end play at each end of the key, as measured by the space between said end and the adjacent end of the notch.

It is to be noted that the coupling can be assembled and taken apart quickly and without tools, and that it automatically tightens and locks itself when tension is applied to the shaft. It is also to be noted that the end portions of the shaft sections are not cut or machined except to form the notches 3 on one side only, and that their backs or cylindrical surfaces bear against the cylindrical bore 7 in the sleeve, so that it is a simple matter to provide accurate alignment of said shaft sections. Furthermore, there are very few parts, all of which are simple to manufacture and easy to clean before assembling; and finally, the notches 3 need not be so deep as to seriously impair the strength of the shafts, and the key and sleeve can be made of ample size.

The dowel or screw 9 is preferably fixed permanently in position in the sleeve 6, and normally functions only as a stop as described above. However, it may be used as a set screw, if desired, to lock the sleeve tightly upon the upper shaft 1.

Figure 2:
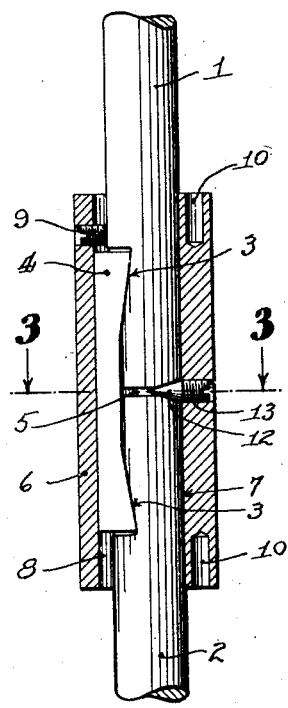
Fig. 2 is a longitudinal section of a modified form of the same coupling adapted for shafts not under continuous tension.
Figure 3:
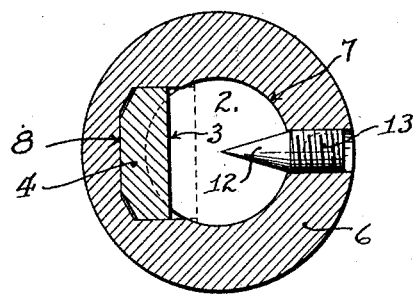
Fig. 3 is a transverse section on the line 3—3 of Fig. 2.

In the form of the invention shown in Fig. 2, which is adapted for shafts not under continuous tension, means are provided for forcing and holding the shaft ends apart, so that the wedging action is maintained. This form of the coupling is similar to that shown in Fig. 1 and described above, except that a suitable wedge 12 is provided to separate the ends of the shafts 1 and 2. This wedge may be of any desired form, as for example a screw 13 having a tapered inner end, as shown, adapted to be screwed through the side of the sleeve 6 into the space 5 between the shaft ends.

The assembling of this form of the device is similar to that described above. After the sleeve is moved to its final position, as shown, the wedge 12 is screwed home, thereby accomplishing the same effect as produced by placing the shafts under tension. This form of the coupling may be used in any position, either vertical or horizontal, and possesses the same advantages as those set forth above in reference to the form shown in Fig. 1.

I claim:—

1. A shaft coupling comprising aligned shaft sections, each having an inclined notch in its end portion, a key adapted for engagement with said notches, a sleeve surrounding said key and the end portions of said shaft sections, said key being adapted to wedge said shaft sections within said sleeve upon relative longitudinal movement in one direction of said shaft sections; and abutments upon said shaft sections adapted for respective engagement with each end of said key to cause its release upon relative movement of said shaft sections in the other direction.

2. A shaft coupling comprising aligned shaft sections each having a notch in its end portion inclined inwardly from the section end; a sleeve surrounding said end portions; and an independent intervening key having its end portions formed to fit said notches and a length adapting it for end play between the ends thereof for wedging and releasing function in conformity with a relative endwise movement of the shaft sections, the amount of end play at each end of said key being less than the amount of relative movement of the shaft sections required for the exercise of said key function.

3. A shaft coupling comprising aligned shaft sections each having a notch in its end portion inclined inwardly from the section end; a sleeve longitudinally slidable upon said end portions; an independent intervening key having its end portions formed to fit said notches to wedge the shaft sections within said sleeve, said key being held in engagement with the shaft sections by said sleeve; and means for limiting the longitudinal movement of said sleeve upon one of said shaft sections to prevent removal of said key therefrom.

4. A shaft coupling comprising aligned shaft sections, each having one side cut away to form a notch with a transversely flat bottom extending entirely across the shaft and inclined longitudinally from the end thereof; a longitudinally disposed key bridging the joint between said shafts, the inner face of said key being inclined to fit the bottoms of said notches and its width being equal to the cut-away portions of said shafts; and a sleeve surrounding said key and the end portions of said shafts, the interior of said sleeve being cylindrical on one side to fit the solid portions of said shafts and having a key way formed in its other side to fit the back of said key, said key and said notches cooperating to wedge said sleeve tightly upon said shafts upon relative movement thereof in one direction and to release said sleeve from both said shafts upon relative movements thereof in the other direction.

In testimony whereof I have signed my name to this specification.

CHARLES V. FOULDS.